United States Patent [19]

Brown

[11] Patent Number: 5,198,822

[45] Date of Patent: Mar. 30, 1993

[54] METHOD AND APPARATUS FOR DETERMINING THE ANGLE OF ARRIVAL OF A RADAR SIGNAL AT A SPINNING INTERFEROMETER

[75] Inventor: Mark W. Brown, Pasadena, Md.

[73] Assignee: Westinghouse Electric Corp., Pittsburgh, Pa.

[21] Appl. No.: 840,242

[22] Filed: Feb. 24, 1992

[51] Int. Cl.$^5$ .............................................. G01S 5/02
[52] U.S. Cl. .................................. 342/424; 342/430; 342/442
[58] Field of Search .................. 342/430, 424, 442

[56] References Cited

U.S. PATENT DOCUMENTS 3,886,555  5/1975  Royal .
4,845,502  7/1989  Carr et al. ............................ 342/430

Primary Examiner—Theodore M. Blum
Attorney, Agent, or Firm—W. G. Sutcliff

[57] ABSTRACT

Method and apparatus for quickly determining the angle of arrival of a signal at a spinning interferometer based on the phase rate of changes and the cone angles between respective pulses received at the spinning interferometer.

9 Claims, 3 Drawing Sheets

METHOD AND APPARATUS FOR DETERMINING THE ANGLE OF ARRIVAL OF A RADAR SIGNAL AT A SPINNING INTERFEROMETER

CROSS REFERENCE TO RELATED APPLICATIONS

This application is related to copending application having U.S. Ser. No. 07/597,476, filed Oct. 12, 1990 and entitled METHOD AND APPARATUS FOR AMBIGUITY RESOLUTION IN A ROTATING INTERFEROMETER by Glenn Barry Guard assigned to the assignee of the subject application, Westinghouse Electric Corporation, and incorporated by reference herein.

BACKGROUND OF THE INVENTION

1. Field of the Invention

The present invention relates to electromagnetic directional finding and, more particularly, to determining the azimuth and elevation angle of an emitter using a spinning interferometer.

2. Description of the Related Art

To determine the azimuth and elevation angle of an emitter as taught in U.S. Ser. No. 07/579,476, a great deal of processing time was required. As a result, real time or near real time operation is not typically feasible. In addition, the angular rotation required precluded operation with signals that illuminated a receiver for only a short period of time, such as mainbeam intercepts.

SUMMARY OF THE INVENTION

It is an object of the present invention to provide a simple apparatus that quickly determines the angle of arrival of a signal at a spinning interferometer.

It is another object of the present invention to provide a method and apparatus of determining the angle of arrival of a signal at a spinning interferometer that can be used to enhance the performance of other interferometer techniques.

To achieve the above and other objects, the present invention provides an apparatus performing a method comprising the steps of receiving signals at multiple headings of an interferometer boresight, measuring a time of arrival, frequency and a phase difference of signals received at the multiple headings of the interferometer boresight, determining a set of phase rate of changes between respective ones of the signals received at the multiple headings of the interferometer, determining a set of complementary cone angles based on the set of phase rate of changes, determining an angle of arrival of a signal relative to the baseline axes based on the cone angles and a rotation rate of the spinning interferometer, and determining an angle of arrival of the signal relative to the boresight based on the angle of arrival relative to the baseline axes and one of the set of cone angles.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
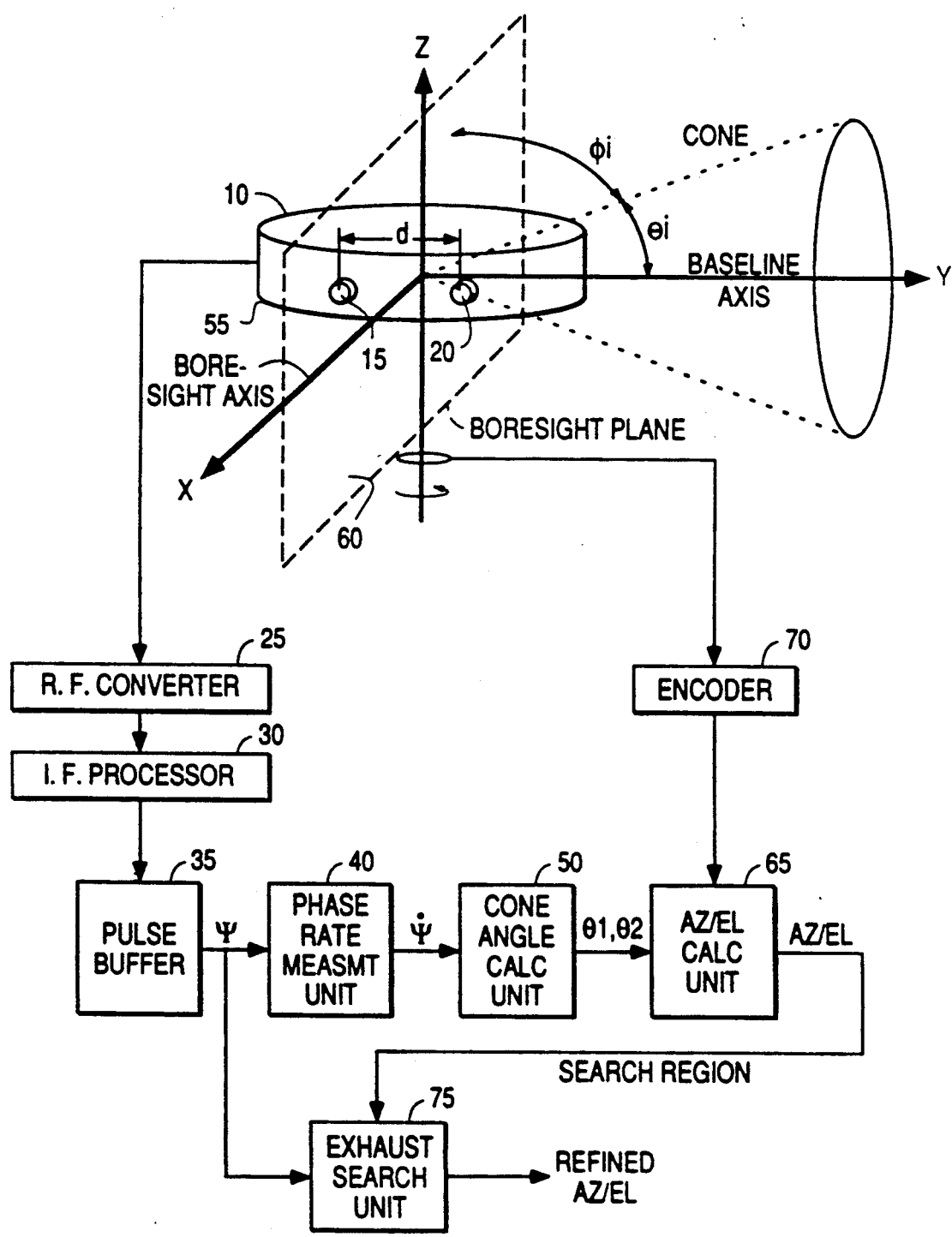
FIG. 1 schematically illustrates a system embodying the present invention.

In FIG. 1 a conventional RF antennas 15 and 20. The frequency of the signals can be in, but is not limited to, the range of 2 GHz-18 GHz. The RF converter 25 converts the signals to an intermediate frequency and applies the signals to a conventional intermediate frequency processor 30. The intermediate frequency processor 30 determines the frequency or wavelength of the received signals and measures the phase difference $\psi_i$ between the signals received at antennas 15 and 20. The measured phase difference $\psi_i$ is a modulo $2\pi$ phase difference between the signals received at the antennas 15 and 20. In addition, the times of arrival $t_i$ of pulses are determined and stored in a pulse buffer 35 together with the wavelength $\lambda_i$ and phase difference $\psi_i$ for the pulses received at the interferometer 10. As the interferometer 10 receives a return pulse, the interferometer is rotating, and therefore its X and Y axes are rotating, about the Z axis as shown in FIG. 1. As a result, the interferometer 10 rotates slightly between received pulses, so that the phase measurements are different from pulse to pulse. The phase measurement can be expressed as follows.

$$\psi = (2\pi d/\lambda) \sin \phi \: \text{modulo} \: 2\pi \qquad (1)$$

Where d is the distance between the antennas 15 and 20 as shown in the FIG. 1, $\lambda$ is the received wavelength and $\phi$ is the angle of arrival of a signal with respect to the boresight plane 60 of the interferometer as shown in FIG. 1.

Figure 3:
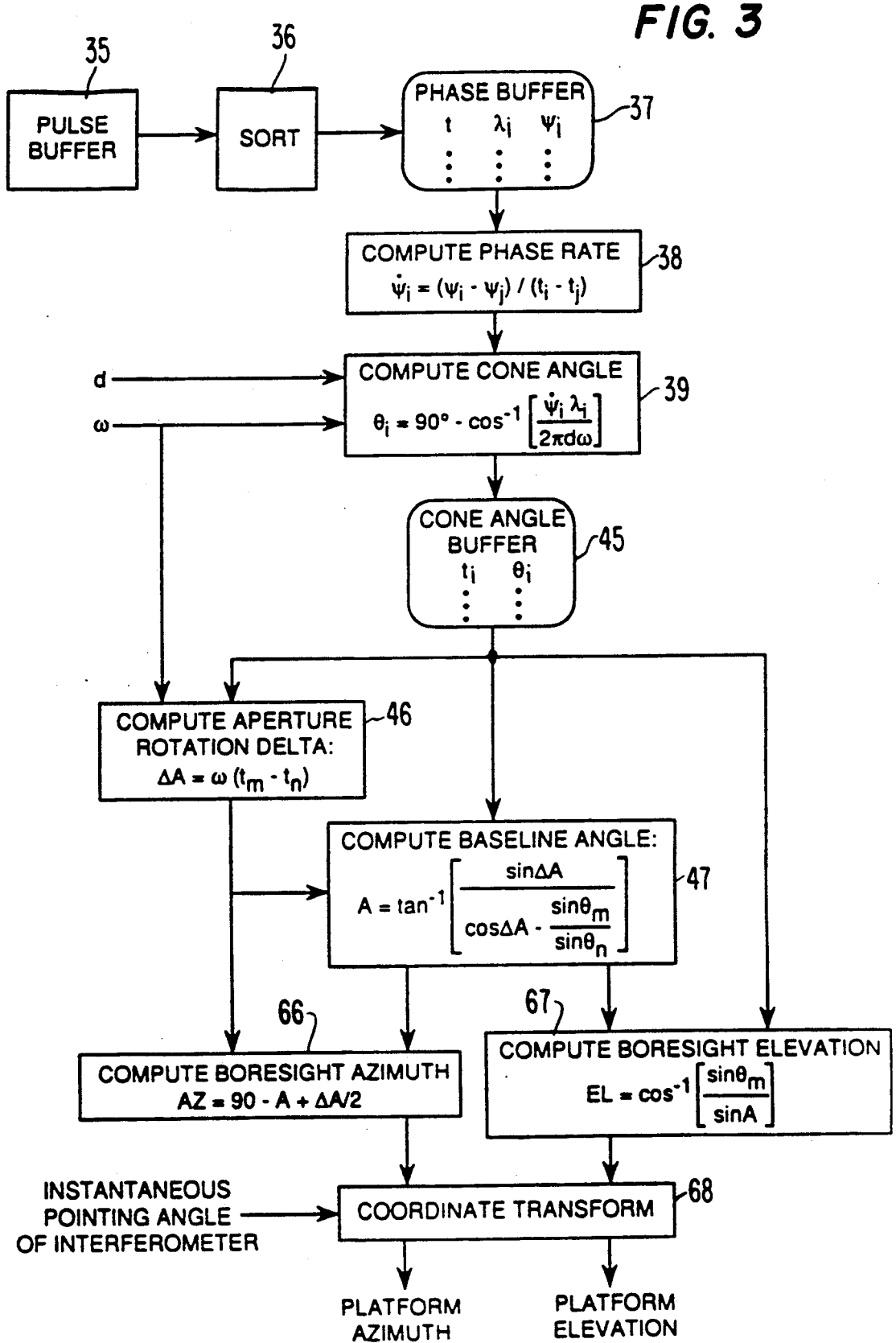
FIG. 3 is a schematic diagram of the processing flow in accordance with the present invention.

The time of arrival $t_i$ of each pulse together with the measured wavelength $\lambda_i$ and phase difference $\psi_i$ are sorted into individual pulse trains based on the measured wavelength and time of arrival. This sorting step 36 and a phase buffer 37 in which the results of the sort are stored are shown in FIG. 3. The sorting can be accomplished by a general purpose computer or a dedicated digital signal processor or a hardwired computation circuit. A suitable general purpose computer would be the Intel 80486. Other sorting techniques can also be used as discussed in, for example, Overman, et al "The Pulse Sorting Transform" IEEE Trans. on Circuits and Systems, Vol. 37, No. 10, Oct. 1990.

There are a number of cone angles that are associated with a given phase difference $\psi_i$. Each cone angle of that group of cone angles exhibits the same phase rate or change. Thus, by taking the derivative of the equation 1, the modulo $2\pi$ ambiguity is avoided and that results in the following:

$$\dot{\psi} = (2\pi d\omega/\lambda)\cos \phi \qquad (2)$$

where $\omega$ is a rotation rate of the interferometer 10 about the Z axis shown in FIG. 1. In practice, the phase rate of change can be approximated by taking the difference between successive phase measurements $\psi_i$ and $\psi_j$ at successive times $t_i$ and $t_j$ as shown in the following.

$$\dot{\psi} = (\psi_i - \psi_j)/(t_i - t_j) \qquad (3)$$

The phase rate of change $\dot{\psi}$ is calculated using equation (3) by a phase rate measurement unit 40 (FIG. 1) based on the phase rates stored in the phase buffer 37 as shown by step 38 in FIG. 3. As mentioned above, the phase buffer 37 stores the sorted pulses so that the pulses from a given radar are identified together by, for example, being grouped together, or identified by via a linked list As a result, the pulses from various radars can be selected, identified and processed separately. When determining the phase rate for a given radar, the pulses processed can be selected arbitrarily at any given time. For example, the first and second pulses can be processed followed by processing the third and fourth at times $t_3$ and $t_4$. An alternative to the phase rate of change expressed in equation (3) is to apply a well known regression algorithm to the many phase measurements available in the phase buffer 37. This would provide a more accurate phase rate measurement over a short period of time such as <10 msec. This is because over this period of time the phase has an approximately linear characteristic.

Because the modulo $2\pi$ ambiguity avoided by employing the phase rate of change, an unambiguous complementary cone angle can be computed based on equation (4) as follows.

$$\theta = \pi/2 - \cos^{-1}(\dot{\psi}_i \lambda_i / 2\pi d\omega) \quad (4)$$

Figure 2:
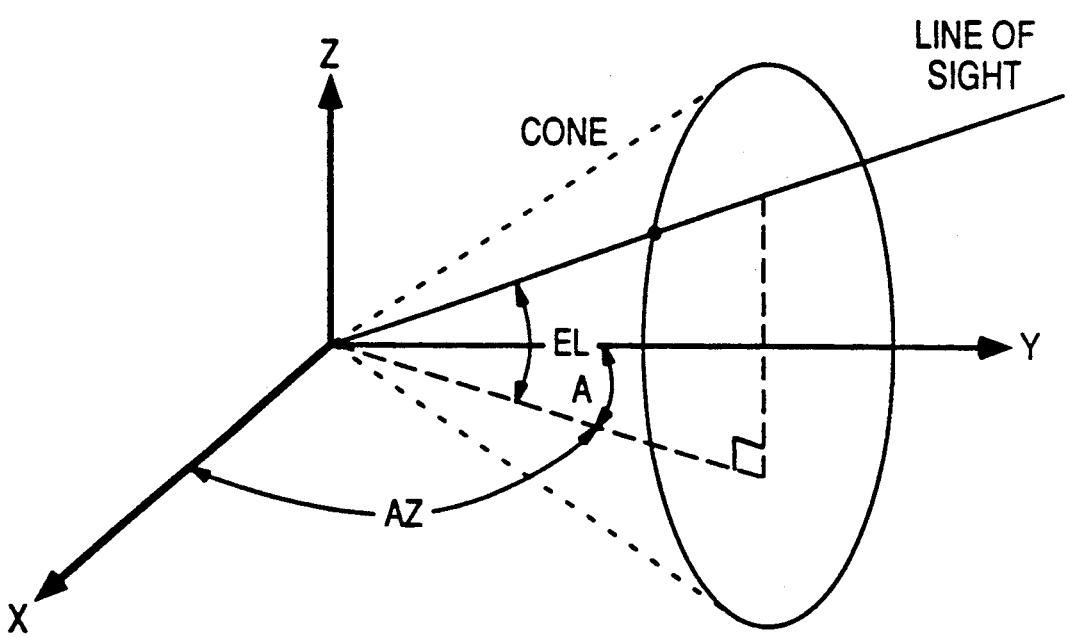
FIG. 2 schematically illustrates the angular relationships between received signals and an interferometer in accordance with the present invention.

A set of complementary cone angles $\theta_i$ for each time $t_i$ is calculated in step 39 by unit 40 and stored in a cone angles buffer 45 shown in FIG. 3. A complementary cone angle $\theta$ is determined by a cone angle calculation unit 50 for each of the phase rate of changes determined by the phase rate measurement unit 40, that is, at each of the times $t_i$, and stored in the cone angles buffer 45. The measurement unit 40 and calculation unit 50 can also be a general purpose computer, a dedicated digital signal processor or a hardwired unit as previously discussed. The cone angles buffer 45 is included in a cone angles calculation unit 50 shown in FIG. 1. In FIG. 1, the coordinate system represents an arbitrary coordinate system. As shown, the Y axis corresponds to or is aligned with the baseline axis of the interferometer 10. The baseline axis corresponds to a line passing through the antennas 15 and 20. In practice, the antennas 15 and 20 are mounted on a flat portion of a disk 55 so that each of the antennas 15 and 20 points in the same direction. In FIG. 1, the X axis is aligned with the boresight axis of the interferometer 10. The boresight axis is included in a vertical boresight plane 60 as shown in FIG. 1. The angle of arrival of a signal relative to the baseline axis (assumed to be the Y axis in FIGS. 1 and 2) is calculated in AZ-EL calculation unit 65. More particularly, a pair of complementary cone angles $\theta_m$ and $\theta_n$ and their corresponding time $t_m$ and $t_n$ are selected from the cone angles buffer 45. The selection is arbitrary. For example, the first and second complementary cone angles and corresponding times can be selected followed by the third and fourth, and so on. However, the selection is arbitrary as with the selection of phases used to compute the phase rate of change discussed above. To determine the angle of arrival of a signal with respect to the baseline of the interferometer, the times and complementary cone angles are used to determine the rotational aperture, $\Delta A$, of the interferometer 10 and the actual angle A in accordance with equations (5) and (6) below.

$$\Delta A = \omega(t_m - t_n) \quad (5)$$

$$A = \tan^{-1}[\sin \Delta A / (\cos \Delta A - (\sin \theta_m \sin \theta_n))] \quad (6)$$

The angular aperture $\Delta A$ represents the angular rotation of the interferometer 10 that occurred between the two complementary cone angle measurement times $t_m$ and $t_n$ given a rotation rate $\omega$ of the spinning interferometer 10. The steps 46 and 47 of equations (5) and (6) as shown in FIG. 3, are performed by the AZ/EL calculation unit 65 which can also be a general purpose computer, a dedicated digital signal processor or a hardwired unit as previously discussed. The AZ/EL calculation unit 65 then determines the actual azimuth angle AZ and elevation angle EL of the signal arriving at the spinning interferometer 10 at a given time $t_m$. This determination is made in accordance with the following.

$$AZ = \pi/2 - A + \Delta A/2 \quad (7)$$

$$EL = \cos^{-1}(\sin \theta_m / \sin A) \quad (8)$$

The calculations of equations (7) and (8) are shown as steps 66 and 67 in FIG. 3. The calculation results in identifying the angle of arrival of a signal at the spinning interferometer 10 at a given point in time with respect to arbitrary position of the coordinate system at that time. To generate signals representative of the physical angle of arrival with respect to the location of the interferometer, the azimuth AZ and elevation angle EL must be transformed using the instantaneous pointing angle of the interferometer 10 provided by an encoder 70. This is shown as step 68 in FIG. 3 and can be performed by unit 65. The coordinate transformation can be accomplished using the unit 65 with any well known transformation operation given the angular relationship between the interferometer coordinate system shown in FIGS. 1 and 2 and the desired reference coordinate system which can be determined by the encoder 70.

Table 1 below illustrates the simulated performance of a system embodying the present invention.

TABLE 1

| | | | | | | | | |
|---|---|---|---|---|---|---|---|---|
| | rotation rate (rpm) | | 500 | | rotation rate (rad/s) | | 52.36 | |
| | rotation delta (deg) | | 0.705 | | rotation delta (rad) | | 0.012 | |
| | pri (microsec) | | 235 | | prf (hz) | | 4255 | |
| | freq (ghz) | | 14.9 | | phase error (deg) | | 12.7 | |
| | wavelength (in) | | 0.79 | | phase error (rad) | | 0.222 | |
| | aperture (in) | | 8 | | # pulses integrated | | 21 | |
| | integ time (msec) | | 5 | | integ factor | | 800.875 | |
| | elevation (deg) | | 10 | | azimuth (deg) | | 20 | |
| 1 | 2 | 3 | 4 | 5 | 6 | 7 | 8 | 9 |
| boresight angle (deg) | phase (rad) | phase rate (rad/s) | calc cone angle (deg) | boresight az (deg) | elev (deg) | rms cone err (deg) | rms az err (deg) | rms el err (deg) |
| 20.000 | 21.373 | | | | | | | |
| 20.705 | 22.094 | 3067.76 | 67.417 | 20.705 | 10.0002 | 1.6 | 3.0 | 7.4 |
| 21.410 | 22.812 | 3053.53 | 66.786 | 21.410 | 10.0002 | 1.6 | 3.0 | 7.6 |

TABLE 1-continued

| | | | | | | | | |
|---|---|---|---|---|---|---|---|---|
| 22.115 | 23.526 | 3038.83 | 66.151 | 22.115 | 10.0002 | 1.5 | 3.0 | 7.7 |
| 22.820 | 24.237 | 3023.68 | 65.512 | 22.820 | 10.0002 | 1.5 | 3.0 | 7.9 |
| 23.525 | 24.943 | 3008.06 | 64.871 | 23.525 | 10.0002 | 1.4 | 2.9 | 8.1 |
| 24.230 | 25.647 | 2991.99 | 64.226 | 24.230 | 10.0002 | 1.4 | 2.9 | 8.2 |
| 24.935 | 26.346 | 2975.47 | 63.578 | 24.935 | 10.0002 | 1.4 | 2.9 | 8.4 |
| 25.640 | 27.041 | 2958.49 | 62.928 | 25.640 | 10.0002 | 1.3 | 2.9 | 8.6 |
| 26.345 | 27.732 | 2941.07 | 62.275 | 26.345 | 10.0002 | 1.3 | 2.8 | 8.7 |
| 27.050 | 28.419 | 2923.21 | 61.620 | 27.050 | 10.0002 | 1.3 | 2.8 | 8.9 |
| 27.755 | 29.102 | 2904.90 | 60.962 | 27.755 | 10.0002 | 1.2 | 2.8 | 9.1 |
| 28.460 | 29.780 | 2886.15 | 60.303 | 28.460 | 10.0002 | 1.2 | | |
| 29.165 | 30.454 | 2866.96 | 59.642 | 29.165 | 10.0002 | 1.2 | | |
| 29.870 | 31.123 | 2847.34 | 58.979 | 29.870 | 10.0002 | 1.2 | | |
| 30.575 | 31.787 | 2827.29 | 58.315 | 30.575 | 10.0002 | 1.1 | | |
| 31.280 | 32.447 | 2806.81 | 57.648 | 31.280 | 10.0002 | 1.1 | | |
| 31.985 | 33.102 | 2785.91 | 56.981 | 31.985 | 10.0002 | 1.1 | | |
| 32.690 | 33.751 | 2764.58 | 56.312 | 32.690 | 10.0002 | 1.1 | | |
| 33.395 | 34.396 | 2742.84 | 55.642 | 33.395 | 10.0002 | 1.0 | | |
| 34.100 | 35.035 | 2720.68 | 54.970 | 34.100 | 10.0002 | 1.0 | | |

The system according to the present invention quickly computes an unambiguous angle of arrival using an estimate of the phase rate of change of pulses arriving at the interferometer 10. As shown in FIG. 1, the resulting signals generated by this system defining the azimuth and elevation of a received signal can be used to drive an exhaustive search unit 75. This exhaustive search unit 75, which could also be a computer, etc., would include the apparatus for ambiguity resolution in a rotating interferometer as disclosed in U.S. patent application having Ser. No. 07/597,476 filed Oct. 12, 1990. This would provide more accurate results even for short on-time emitters by limiting the amount of processing needed to be performed by the exhaustive search unit 75. In other words, the number of possible azimuth angles and elevation angles can be limited; thus, reducing the amount of processing needed to be performed by the exhaustive search unit 75.

The many features and advantages of the present invention are apparent from the detailed specification and thus, it is intended by the appended claims to cover all such features and advantages of the devices which follow in the true spirit and scope of the invention. Further, since numerous modifications and changes will readily occur to those skilled in the art, it is not desired to limit the invention to the exact construction and operation illustrated and described. Accordingly, all suitable modifications and equivalent made resorted to as falling within the scope and spirit of the invention.

What is claimed is:

1. A method of determining an angle of arrival of signals at a spinning interferometer having a boresight and a baseline axis, said method comprising the steps of:
   (a) receiving signals at multiple headings of the interferometer boresight;
   (b) measuring a time of arrival, frequency and a phase difference of signals received at the multiple headings of the interferometer boresight;
   (c) determining a set of phase rate of changes between respective ones of the signals received at the multiple headings of the interferometer;
   (d) determining a set of complementary cone angles based on the set of phase rate of changes;
   (e) determining an angle of arrival of a signal relative to the baseline axis based on the cone angles and a rotation rate of the spinning interferometer; and
   (f) determining an angle of arrival of the signal relative to the boresight axis based on the angle of arrival relative to the baseline axis and one of the set of cone angles.

2. A method as recited in claim 1, wherein step (c) performs $$\dot{\psi}=(\psi_i-\psi_j)/(t_i-t_j)$$

where t is pulse arrival times, $\psi$ is a phase measurement, and $\dot{\psi}$ is phase rate of change.

3. A method as recited in claim 2, wherein step (d) performs $$\theta=\pi/2\cos^{-1}(\dot{\psi}_i\lambda_i/2\pi d\omega)$$

where $\omega$ is rotation rate, $\lambda$ is the received wave length and $\theta$ is the cone angle.

4. A method as recited in claim 3, wherein steps (e) and (f) perform $$\Delta A=\omega(t_m-t_n)$$

$$A=\tan^{-1}[\sin \Delta A/(\cos \Delta A-(\sin \theta_m/\sin \theta_n))]$$

$$AZ=\pi/2-A+\Delta A/2$$

$$EL=\cos^{-1}(\sin \theta_m/\sin A)$$

where $\Delta A$ is aperture change, A is baseline angle, AZ is azimuth and EL is elevation.

5. The method as set forth in claim 1, wherein the interferometer is rotated about an axis orthogonal to the boresight axis.

6. An apparatus for determining an angle of signals at a spinning interferometer spinning at a spin rate comprising:
   first means for determining a phase rate of change between the signals; and
   second means for determining cone angles of the signals response to the phase rate of change; and
   third means for determining angle of arrival responsive to the cone angles and the spin rate.

7. An apparatus as recited in claim 6, wherein said first means comprises:
   a pulse buffer; and
   a phase rate measurement unit connected to said pulse buffer.

8. An apparatus as recited in claim 7, wherein said second means comprises:
   a cone angle calculation unit connected to said phase rate measurement unit; and
   a cone angle buffer connected to said cone angel calculation unit.

9. An apparatus as recited in claim 8, wherein said third means comprises an azimuth/elevation calculation unit connected to said cone angle buffer.

* * * * *